(12) United States Patent
Kim et al.

(10) Patent No.: US 11,827,297 B2
(45) Date of Patent: Nov. 28, 2023

(54) SMART FACTORY SYSTEM FOR VEHICLES

(71) Applicants: HYUNDAI MOTOR COMPANY, Seoul (KR); KIA CORPORATION, Seoul (KR)

(72) Inventors: Byeong Geon Kim, Ulsan (KR); Taeuk Cha, Changwon-si (KR); Chan Woo Park, Ulsan (KR); SungHwan Lee, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/538,107

(22) Filed: Nov. 30, 2021

(65) Prior Publication Data

US 2023/0128973 A1  Apr. 27, 2023

(30) Foreign Application Priority Data

Oct. 25, 2021 (KR) .......................... 10-2021-0142412

(51) Int. Cl.
*B62D 65/02* (2006.01)
*B23P 21/00* (2006.01)
(Continued)

(52) U.S. Cl.
CPC .......... *B62D 65/022* (2013.01); *B23P 21/004* (2013.01); *B62D 65/02* (2013.01);
(Continued)

(58) Field of Classification Search
CPC ......... Y10T 29/49009; Y10T 29/53143; Y10T 29/49004; Y10T 29/49829;
(Continued)

(56) References Cited

U.S. PATENT DOCUMENTS

2019/0127000 A1* 5/2019 Eberl ...................... G01N 21/84
2021/0354256 A1* 11/2021 Negre .............. G05B 19/41895

FOREIGN PATENT DOCUMENTS

| CN | 108161393 A | * | 6/2018 | |
| CN | 110744300 A | * | 2/2020 | ............ B23P 21/004 |
| KR | 20200063455 A | * | 6/2020 | |

OTHER PUBLICATIONS

Translation of KR-20200063455-A (Year: 2020).*
Translation of CN-110744300-A (Year: 2020).*
Translation of CN-108161393-A (Year: 2018).*

* cited by examiner

*Primary Examiner* — Matthew P Travers
(74) *Attorney, Agent, or Firm* — McDonnell Boehnen Hulbert & Berghoff LLP

(57) ABSTRACT

A smart factory system for an electrified vehicle includes a components supplying section in which a drive-motor and a one-kit module of speed reducer component parts for forming a speed reducer to be assembled to the drive-motor are supplied to an upper portion of an autonomous mobile robot, a stator assembling section in which a stator to be assembled to the drive-motor is assembled, a speed reducer assembling section configured to sequentially assemble the speed reducer component parts to the drive-motor, a sub-assembling section in which the drive-motor, the stator, and the speed reducer component parts are electrically interconnected, and a test section in which an assembly quality of the drive-motor, the stator, and the speed reducer component parts is checked.

7 Claims, 6 Drawing Sheets

(51) Int. Cl.
*B62D 65/10* (2006.01)
*B62D 65/18* (2006.01)
*H02K 15/00* (2006.01)
*G05B 19/418* (2006.01)

(52) U.S. Cl.
CPC .............. *B62D 65/10* (2013.01); *B62D 65/18* (2013.01); *H02K 15/00* (2013.01); *B23P 2700/50* (2013.01); *G05B 19/41895* (2013.01)

(58) Field of Classification Search
CPC ......... Y10T 29/49904; Y10T 29/53022; Y10T 29/53187; Y10T 29/53265; Y10T 29/534; Y10T 29/53417; Y10T 29/53539–29/53548; B23P 2700/50; B23P 21/004; B62D 65/005; B62D 65/02; B62D 65/022; B62D 65/10; B62D 65/18; H02K 15/00; H02K 15/02; G05B 19/41895

See application file for complete search history.

SMART FACTORY SYSTEM FOR VEHICLES

CROSS REFERENCE TO RELATED APPLICATIONS

This application claims priority to and the benefit of Korean Patent Application No. 10-2021-0142412 filed in the Korean Intellectual Property Office on Oct. 25, 2021, the entire contents of which are incorporated herein by reference.

BACKGROUND

(a) Field

The present disclosure relates to a smart factory system for a vehicle.

(b) Description of the Related Art

In general, a vehicle electrification component part refers to a component part applied to an electric vehicle (EV), a hybrid electric vehicle (HEV), a plug-in hybrid electric vehicle (PHEV), a fuel cell electric vehicle (FCEV), and the like, which uses an electric drive-motor instead of an internal combustion engine as a driving power source of the vehicle.

Such electrification component parts convert the electrical energy of the battery into mechanical energy, to form driving power for the environment-friendly vehicle.

For example, the electrification component parts include a drive-motor, an inverter, a converter, a battery, and the like, and they are assembled to form a powertrain (i.e., a driving system) of the vehicle.

Typically, the powertrain is completed while passing through various factories. That is, a drive-motor, a speed reducer, and the like applied to the power electric (PE) module as the power train are produced at different factories, and then the powertrain is completed by assembling respective component parts while the drive-motor is being moved factory to factory.

Accordingly, in the conventional art, logistics costs may become excessive due to the division of production and assembly factories.

In addition, in the conventional art, since the drive-motor is moved factory to factory in a semi-assembled state, there may be a disadvantage in that the cleanliness or quality control of the product is insufficient.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a smart factory system for a vehicle capable of reducing manufacturing cost and factory site.

According to such a smart factory system according to the present disclosure, since the powertrain is assembled in a single factory, fast feedback and response to quality problems or design changes may be achieved.

A smart factory system for an electrified vehicle includes a components supplying section in which a drive-motor and a one-kit module of speed reducer component parts for forming a speed reducer to be assembled to the drive-motor are supplied to an upper portion of an autonomous mobile robot, a stator assembling section in which a stator to be assembled to the drive-motor is assembled, a speed reducer assembling section configured to sequentially assemble the speed reducer component parts to the drive-motor, a sub-assembling section in which the drive-motor, the stator, and the speed reducer component parts are electrically connected, and a test section in which an assembly quality of the drive-motor, the stator, and the speed reducer component parts is checked.

The autonomous mobile robot may include a body attached with a lidar sensor, a motor jig configured on an upper portion of the body and connectable to the drive-motor, a seating portion configured on the upper portion of the body, configured to be seated with the one-kit module, and mounted with a vision sensor used for checking an omitted part of the speed reducer component parts, and a monitor configured on the upper portion of the body and used for checking an assembly processing status.

In the components supplying section, when the autonomous mobile robot is positioned to a components pallet storing the drive-motor and the one-kit module, the autonomous mobile robot may be configured to connect the motor jig to the drive-motor, and to load the one-kit module to be seated on the seating portion.

The stator assembling section may include a first stator assembling sub-section in which hairpins are aligned in a dummy jig, a second stator assembling sub-section in which the hairpins are chemically coated, a third stator assembling sub-section in which the hairpins aligned in the dummy jig are inserted into the stator, and a fourth stator assembling sub-section in which the hairpins inserted into the stator are cut and welded.

The stator assembling section may include a stator pallet configured to store the stator completed by insertion of the hairpins.

The speed reducer assembling section may include an assembling device configured to assemble a rear cover and a resolver included in the one-kit module, an applier configured to apply a sealer to the drive-motor, a measurement device configured to transfer, to a mounting jig by a transfer device, the drive-motor and stator assembled together and seated on the autonomous mobile robot, and to measure a status of the drive-motor and stator, and a pressurizer configured to apply pressure to the drive-motor and stator mounted on the mounting jig.

The speed reducer assembling section may include a test robot configured to check an assembled state of the speed reducer component parts.

In the sub-assembling section, an inverter, a junction block, cables, and hoses may be assembled to the drive-motor and the stator.

The test section may include a first test sub-section in which a test cable is connected to the drive-motor and the stator, and a leak test is performed, and a second test sub-section in which the test cable is disconnected and a bracket and an oil plug are assembled.

A smart factory system for an electrified vehicle may further include a finished product pallet configured to store a finished component part that has passed through the test section, by the autonomous mobile robot.

Therefore, according to an exemplary embodiment, the powertrain for an electrified vehicle may be manufactured in a single factory rather than through dispersed assembling factories, thereby reducing a manufacturing cost and an overall factory site.

In addition, since the powertrain is assembled in a single factory, fast feedback and response to quality problems or design changes may be achieved.

Resultantly, the smart factory system for a vehicle may reduce an overall cycle time, thereby improving productivity.

Other effects that may be obtained or are predicted by an exemplary embodiment will be explicitly or implicitly described in a detailed description of the present disclosure. That is, various effects that are predicted according to an exemplary embodiment will be described in the following detailed description.

DETAILED DESCRIPTION

Figure 1:
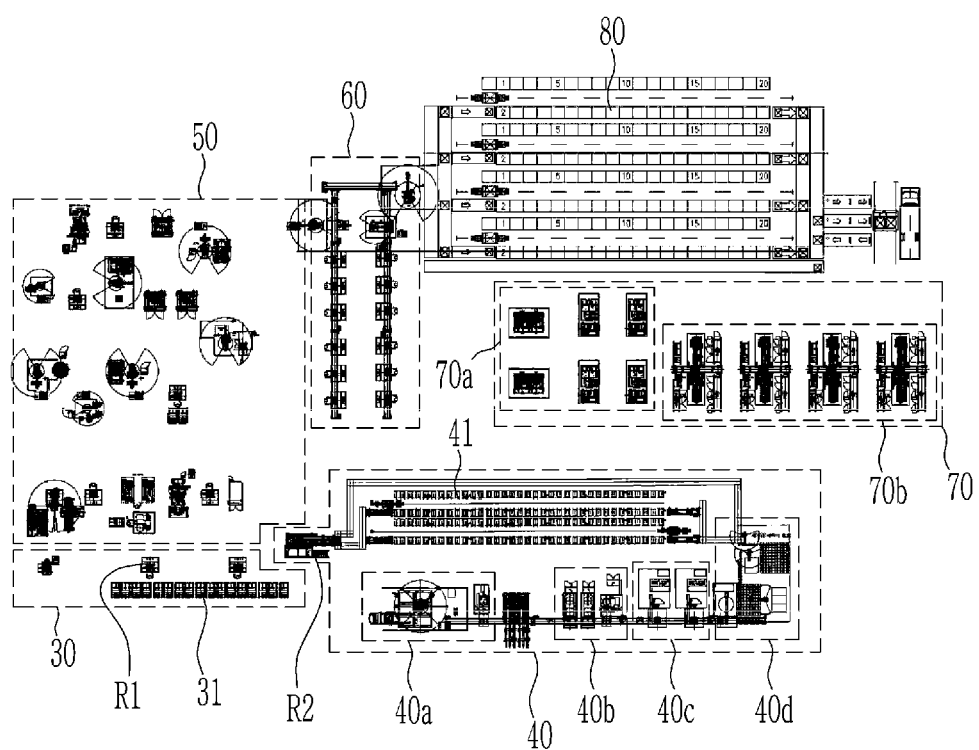
FIG. 1 is an overall configuration diagram of a smart factory system for a vehicle according to an exemplary embodiment.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

A smart factory system according to an exemplary embodiment may be applied to manufacture a powertrain for an electrified vehicle.

In this disclosure, the term electrified vehicle refers to a vehicle that uses a drive-motor to drive the vehicle, such as an electric vehicle, a hybrid electric vehicle, a plug-in hybrid electric vehicle, a fuel cell electric vehicle.

The term smart factory in a smart factory system for a vehicle according to an exemplary embodiment refers to factory where sensors are provided to facilities and machines in the factory and data are collected and analyzed in real time by the sensors.

Accordingly, the smart factory may see all the situations in the factory at a glance, analyze situations, and control itself according to the intended purpose.

An unmanned transport system may be applied to such a smart factory.

In the present disclosure, an autonomous mobile robot will be described as an example of the unmanned transport system.

Figure 2:
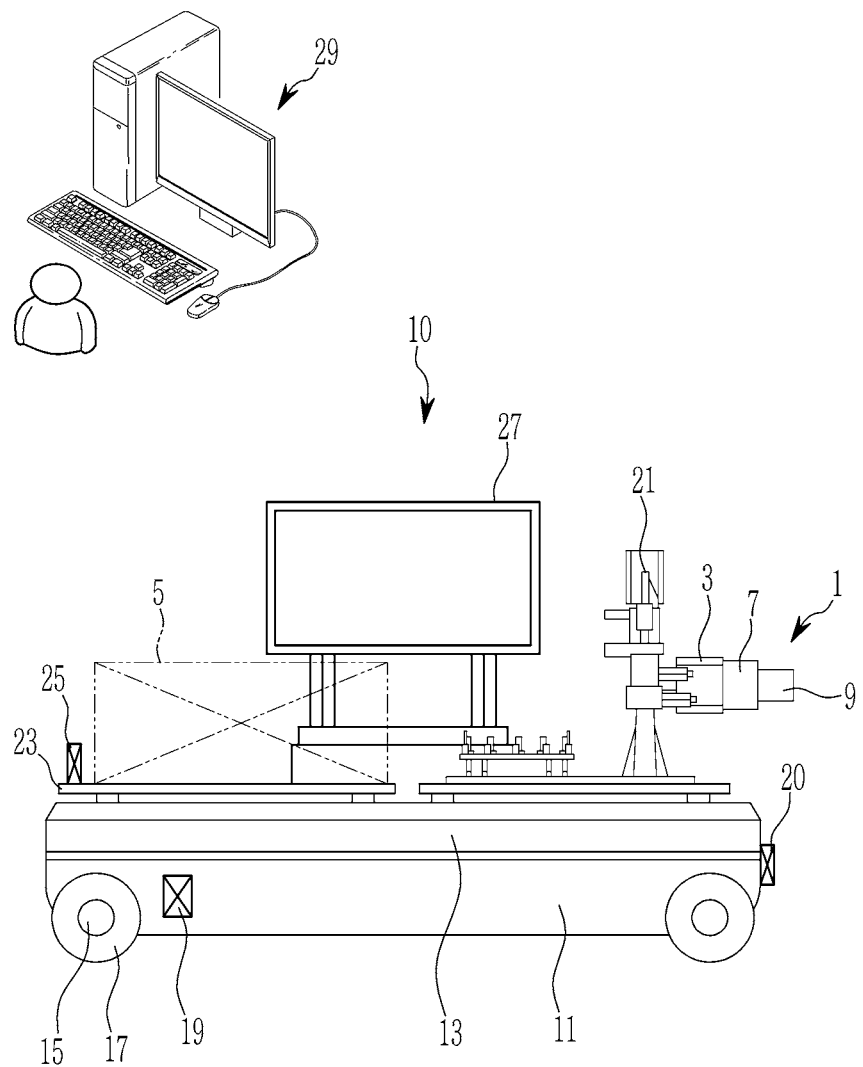
FIG. 2 is a schematic diagram of an autonomous mobile robot applied to a smart factory system for a vehicle according to an exemplary embodiment.

FIG. 1 is an overall configuration diagram of a smart factory system for a vehicle according to an exemplary embodiment, and FIG. 2 is a schematic diagram of an autonomous mobile robot applied to a smart factory system for a vehicle according to an exemplary embodiment.

Referring to FIG. 1, a smart factory system for a vehicle according to an exemplary embodiment includes a components supplying section 30, a stator assembling section 40, a speed reducer assembling section 50, a sub-assembling section 60, and a test section 70.

A smart factory system for a vehicle according to an exemplary embodiment is configured such that assembling of a powertrain 1 (refer to FIG. 2) is completed as an autonomous mobile robot (AMR) 10 moves.

The components supplying section 30 is a section in which components constituting the powertrain 1 are supplied to the autonomous driving robot 10.

In the components supplying section 30, a drive-motor 3 as well as speed reducer component parts 900, as a one-kit module 5 (refer to FIG. 2), for forming a speed reducer 9 to be assembled to the drive-motor 3 are supplied to an upper portion of the autonomous mobile robot 10.

Referring to FIG. 2, the autonomous mobile robot 10 includes a body 11 attached with a lidar sensor 20. The lidar sensor 20 may detect a distance to and various physical properties of a target object by illuminating a laser.

The body 11 includes a battery 13 as a source of moving power, a servo-motor 15 and wheels 17 for travelling, and a control board 19 configured to control the travelling.

A motor jig 21 connectable to the drive-motor 3 is configured on an upper portion of the body 11. The motor jig 21 may be configured to be replaced depending on the specification of the drive-motor 3.

A seating portion 23 configured to be seated with the one-kit module 5 is configured on the upper portion of the body 11.

The one-kit module 5 refers to a set of all speed reducer component parts 900 required for assembling the speed reducer. For example, the speed reducer component parts 900 included in the one-kit module 5 may include a rear cover 90 and a resolver 91.

The drive-motor 3 and the one-kit module 5 to be supplied may be set depending on specification of the powertrain 1.

A vision sensor 25 used for checking an omitted part of the speed reducer component parts 900 may be mounted on the seating portion 23. In addition, a monitor 27 is configured on the upper portion of the body 11. The monitor 27 is used for checking a processing status of assembling the powertrain 1. For example, the monitor 27 may display omission, double inclusion, and the like of various component parts.

The autonomous mobile robot 10 may measure a surrounding area by the lidar sensor 20, to recognize a location and to compose and utilize surrounding map.

The autonomous mobile robot 10 may communicate with a server 29 to generate a map.

In this case, the server 29 is a separately configured computer, and may be defined as a controller that controls the overall automotive smart factory system of the present disclosure.

Referring back to FIG. 1, in the components supplying section 30, when the autonomous mobile robot 10 is positioned to a components pallet 31 storing the drive-motor 3 and the one-kit module 5, the autonomous mobile robot 10 is configured to connect the motor jig 21 to the drive-motor 3, and to load the one-kit module 5 to be seated on the seating portion 23.

The drive-motor 3 and the one-kit module 5 may be supplied to the autonomous mobile robot 10 by a suppling robot R1.

In addition, the stator assembling section 40 is formed adjacent to the components supplying section 30.

A stator 7 to be assembled to the drive-motor 3 is supplied to the stator assembling section 40, and the drive-motor 3 and the stator 7 are assembled in the stator assembling section 40. The stator assembling section 40 may be divided into first to fourth stator assembling sub-sections 40a to 40d.

Figure 3:
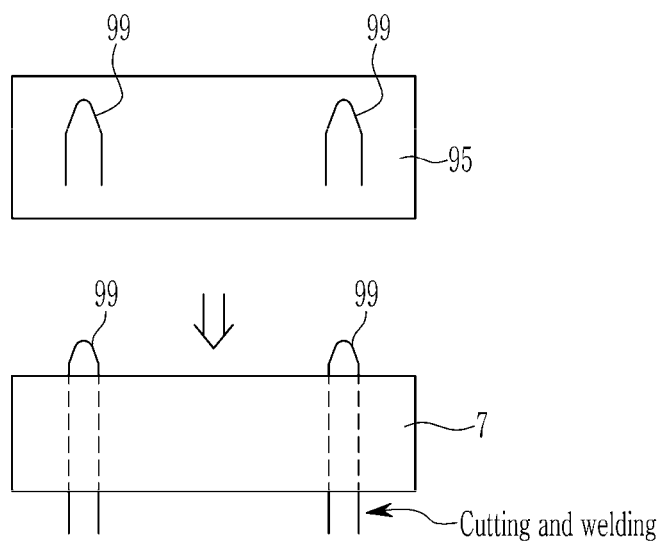
FIG. 3 is a schematic diagram illustrating a process in which hairpins are assembled to a stator in a stator assembling section applied to an automobile smart factory system according to an embodiment.

FIG. 3 is a schematic diagram illustrating a process in which hairpins are assembled to a stator in a stator assembling section applied to an automobile smart factory system according to an embodiment.

Referring to FIG. 3, in the first stator assembling sub-section 40a, hairpins 99 are aligned in a dummy jig 95. The dummy jig 95 is to preliminarily align the hairpins 99 to be inserted into the stator 7, in accordance with the specification of the stator 7. In the second stator assembling sub-section 40b, the hairpins 99 are chemically coated.

In the third stator assembling sub-section 40c, the hairpins 99 aligned in the dummy jig 95 are inserted into the stator 7. That is, in the third stator assembling sub-section 40c, the hairpins 99 preliminarily aligned in the dummy jig 95 may be clamped at once to be inserted into the stator 7.

In the fourth stator assembling sub-section 40d, the hairpins 99 inserted into the stator 7 are cut and welded. That is, in the fourth stator assembling sub-section 40d, end portions of the hairpins 99 inserted into the stator 7 may be partially cut and welded together to be electrically connected with each other. The stator 7 is completed through the first to fourth stator assembling sub-sections 40a to 40d. The stator 7 completed by insertion of the hairpins 99 is stored in a stator pallet 41 (refer to FIG. 1), up to a predetermined quantity. The stator 7 that has been completed and stored in the stator pallet 41 may be supplied to the autonomous mobile robot 10 by a suppling robot R2, when the autonomous mobile robot 10 is positioned to the stator assembling section 40.

Figure 4:
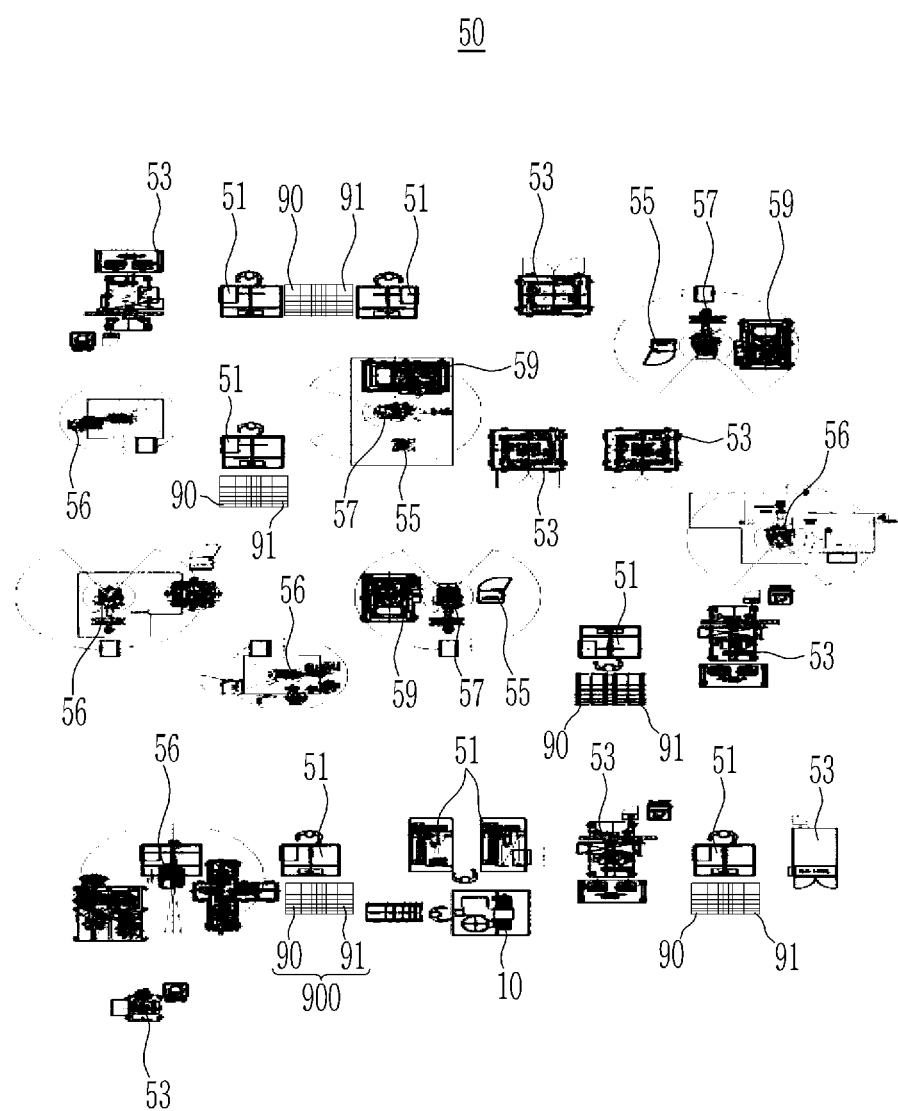
FIG. 4 is a configuration diagram showing a speed reducer assembling section applied to a smart factory system for a vehicle according to an exemplary embodiment.

FIG. 4 is a configuration diagram showing a speed reducer assembling section applied to a smart factory system for a vehicle according to an exemplary embodiment.

Referring to FIG. 4, the speed reducer assembling section 50 formed adjacent to the stator assembling section 40.
In the speed reducer assembling section 50, the speed reducer component parts 900 supplied as the one-kit module 5 are sequentially assembled to the drive-motor 3.

At least one assembling device 51 configured to assemble the rear cover 90 and the resolver 91 included in the one-kit module 5 may be disposed in the speed reducer assembling section 50. In addition, at least one applier 53 configured to apply a sealer to the drive-motor 3 may be disposed the speed reducer assembling section 50.

In the speed reducer assembling section 50, a measurement device 55 may be disposed. The measurement device 55 is configured to transfer the drive-motor 3 and the stator 7 assembled together and seated on the autonomous mobile robot 10 to a mounting jig 59 by a transfer device 57, and to measure a status of the drive-motor 3 and the stator 7.

A pressurizer 56 configured to apply pressure to the drive-motor 3 and the stator 7 mounted on the mounting jig 59, to reinforce coupling of the drive-motor 3 and the stator 7, may be disposed in the speed reducer assembling section 50.

In the speed reducer assembling section 50, the assembling device 51, the applier 53, the measurement device 55, and the pressurizer 56 may be respectively in a quantity of at least one.

Positions of the assembling device 51, the applier 53, the measurement device 55, and the pressurizer 56 may be set in consideration of a moving path of the autonomous mobile robot 10.

That is, in the speed reducer assembling section 50, the assembling device 51, the applier 53, the measurement device 55, and the pressurizer 56 may be disposed in plural quantities, such that a plurality of the autonomous mobile robots 10 may be employed to enable simultaneous assembly.

The assembling device 51, the applier 53, the measurement device 55, and the pressurizer 56 of the speed reducer assembling section 50 applied to a smart factory system for a vehicle according to an exemplary embodiment are not limited in arrangement and quantities as shown in FIG. 4, and if necessary, the arrangement and quantities may be changed.

Figure 5:
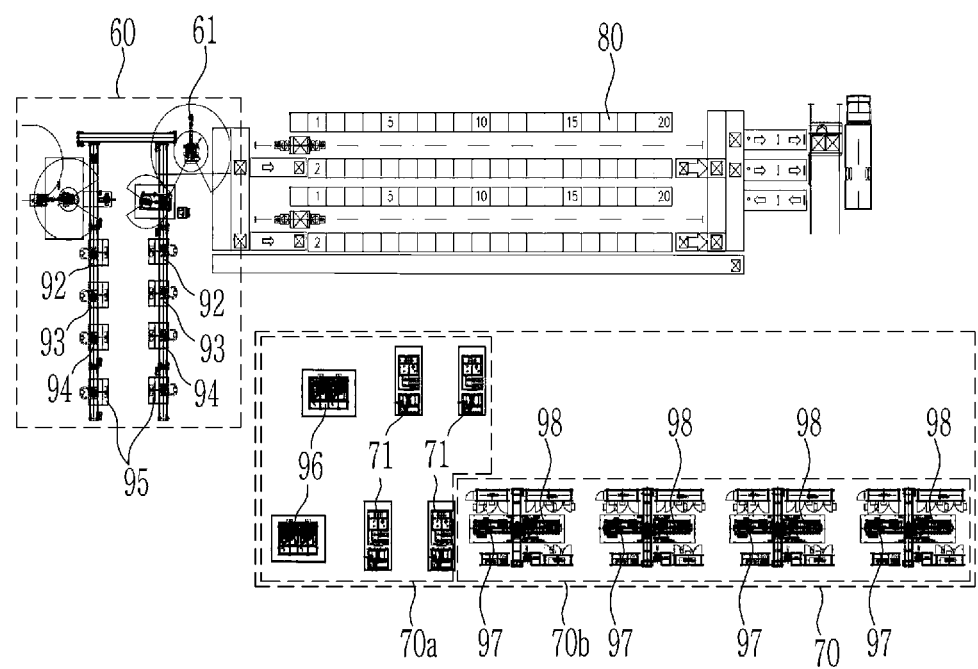
FIG. 5 is a configuration diagram showing a sub-assembling section and a test section applied to a smart factory system for a vehicle according to an exemplary embodiment.

FIG. 5 is a configuration diagram showing a sub-assembling section and a test section applied to a smart factory system for a vehicle according to an exemplary embodiment.

Referring to FIG. 5, the sub-assembling section 60 formed adjacent to the speed reducer assembling section 50. In the sub-assembling section 60, the drive-motor 3, the stator 7, and the speed reducer component parts 900 (FIG. 4) are electrically connected. In the sub-assembling section 60, an inverter 92, a junction block 93, cables 94, hoses 95, and the like are assembled to the drive-motor 3 and the stator 7.

At this time, a test robot 61 configured to check an assembled state of the speed reducer component parts 900 is disposed in the speed reducer assembling section 50.

As the autonomous mobile robot 10 moves, the test robot 61 is configured to check an assembled state of the speed reducer component parts to the drive-motor 3 seated on the autonomous mobile robot 10, and send the assembled state to the monitor 27.

The test section 70 is formed adjacent to the sub-assembling section 60.
In the test section 70, an assembly quality of the drive-motor 3, the stator 7, and the speed reducer component parts 900 is checked. The test section 70 may be divided into a first test sub-section 70a and a second test sub-section 70b.

In the first test sub-section 70a, a test cable 96 is connected to the drive-motor 3 and the stator 7, and a leak test is performed. That is, in the first test sub-section 70a, the test cable 96 is connected to the drive-motor 3 and the stator 7. Then, the drive-motor 3 and the stator 7 connected to the test cable 96 is inserted into a test box 71, and the leak test is performed. At this time, the leak test may be made by injecting and drawing out the oil into and from the drive-motor 3 and the stator 7.

In the second test sub-section 70b, the test cable 96 is disconnected from the drive-motor 3 and the stator 7, and then a bracket 97 and an oil plug 98 are assembled to the drive-motor 3 and the stator 7.

The powertrain 1 finished by passing through the test section 70 is stored in a finished product pallet 80, by the autonomous mobile robot 10.

Figure 6:
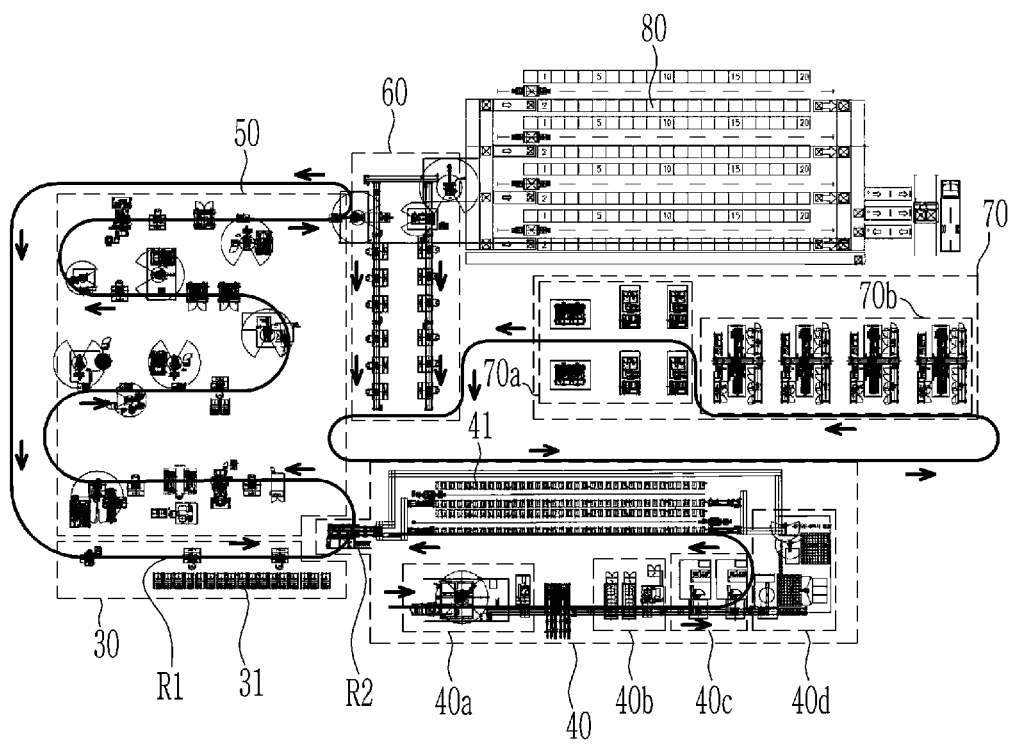
FIG. 6 is a drawing for explaining an operation of a smart factory system for a vehicle according to an exemplary embodiment.

FIG. 6 is a drawing for explaining an operation of a smart factory system for a vehicle according to an exemplary embodiment.

Referring to FIG. 6, in a smart factory system for a vehicle according to an exemplary embodiment, the drive-motor 3 and the one-kit module 5 is supplied to the autonomous mobile robot 10, in the components supplying section 30.

Then, the autonomous mobile robot 10 moves to the stator assembling section 40, and supplied with the stator 7 to be assembled to the drive-motor 3. At this time, the stator 7 is supplied in a state inserted with the hairpins 99.

Then, the autonomous mobile robot 10 moves to the speed reducer assembling section 50, and as the autonomous mobile robot 10 moves, the speed reducer component parts 900 supplied in the one-kit module 5 are sequentially assembled.

Subsequently, the autonomous mobile robot 10 moves to the sub-assembling section 60, and the drive-motor 3, the stator 7, and the speed reducer component parts 900 seated on the autonomous mobile robot 10 are electrically connected.

Then, the autonomous mobile robot 10 moves to the test section 70, and a leak test and the like is performed on the assembly of the drive-motor 3, the stator 7, and the speed reducer component parts 900.

Finally, the finished powertrain 1 is stored in the finished product pallet 80.

Therefore, according to a smart factory system for a vehicle according to an exemplary embodiment, the powertrain for an electrified vehicle 1 may be manufactured in a single factory rather than through dispersed assembling factories, thereby reducing a manufacturing cost and an overall factory site.

In addition, since the powertrain is assembled in a single factory, fast feedback and response to quality problems or design changes may be achieved.

Resultantly, the smart factory system for a vehicle may reduce an overall cycle time, thereby improving productivity.

In addition, a smart factory system for a vehicle according to an exemplary embodiment may reduce logistics cost, and provides flexibility in quantities of required component parts.

In addition, when the model or specification of the powertrain 1 to be manufactured is to be changed, the facilities may be slightly expanded and the moving path of the autonomous mobile robot 10 may be altered, thereby reducing the shut-down period of the factory.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A smart factory system for an electrified vehicle, the smart factory system comprising:
   an autonomous mobile robot;
   a components supplying section including a drive-motor, a one-kit module of speed reducer component parts stored in a components pallet, and a first supplying robot, wherein the drive-motor and the one-kit module are configured to be supplied to an upper portion of the autonomous mobile robot by the first supplying robot;
   a stator assembling section including a stator, a stator pallet, and a second supplying robot, wherein the stator is configured to be stored in the stator pallet, and to be supplied from the stator pallet to the autonomous mobile robot by the second supplying robot; and
   a test section including a test cable and a test box configured to check an assembly quality of the drive-motor and the stator.

2. The smart factory system of claim 1, wherein the autonomous mobile robot comprises:
   a body having a lidar sensor;
   a motor jig positioned on an upper portion of the body and connectable to the drive-motor;
   a seating portion positioned on the upper portion of the body, the seating portion configured to be seated with the one-kit module, and mounted with a vision sensor configured to check an omitted part of the speed reducer component parts; and
   a monitor positioned on the upper portion of the body and configured to check an assembly processing status.

3. The smart factory system of claim 2, wherein, in the components supplying section, when the autonomous mobile robot is positioned to the components pallet storing the drive-motor and the one-kit module, the autonomous mobile robot is configured to connect the motor jig to the drive-motor, and to load the one-kit module to be seated on the seating portion.

4. The smart factory system of claim 1, wherein the stator assembling section further comprises:
   a plurality of hairpins configured to be aligned in a dummy jig, chemically coated, cut and welded, and inserted into the stator.

5. The smart factory system of claim 1, further comprising a test robot configured to check an assembled state of the speed reducer component parts.

6. The smart factory system of claim 1, wherein the test cable is connected to the drive-motor and the stator, and is configured to perform a leak test.

7. The smart factory system of claim 1, further comprising a finished product pallet configured to store a finished component part that has passed through the test section, by the autonomous mobile robot.

* * * * *